June 5, 1956 B. WOLF 2,748,528
NOVELTY EYEGLASSES
Filed Dec. 10, 1954 2 Sheets-Sheet 1
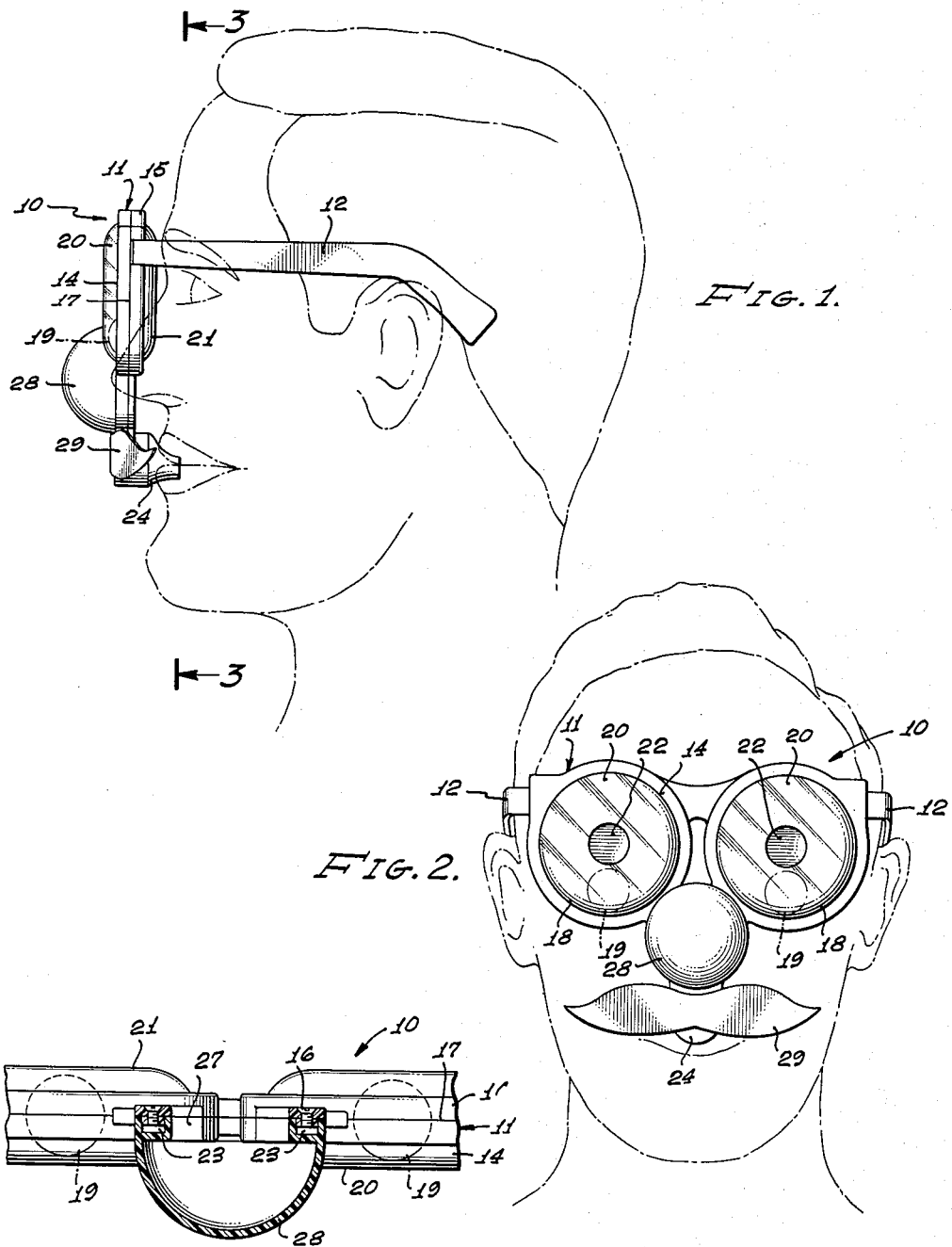
BERN WOLF,
INVENTOR.
BY Lyon & Lyon
ATTORNEYS.

June 5, 1956  B. WOLF  2,748,528
NOVELTY EYEGLASSES
Filed Dec. 10, 1954  2 Sheets-Sheet 2
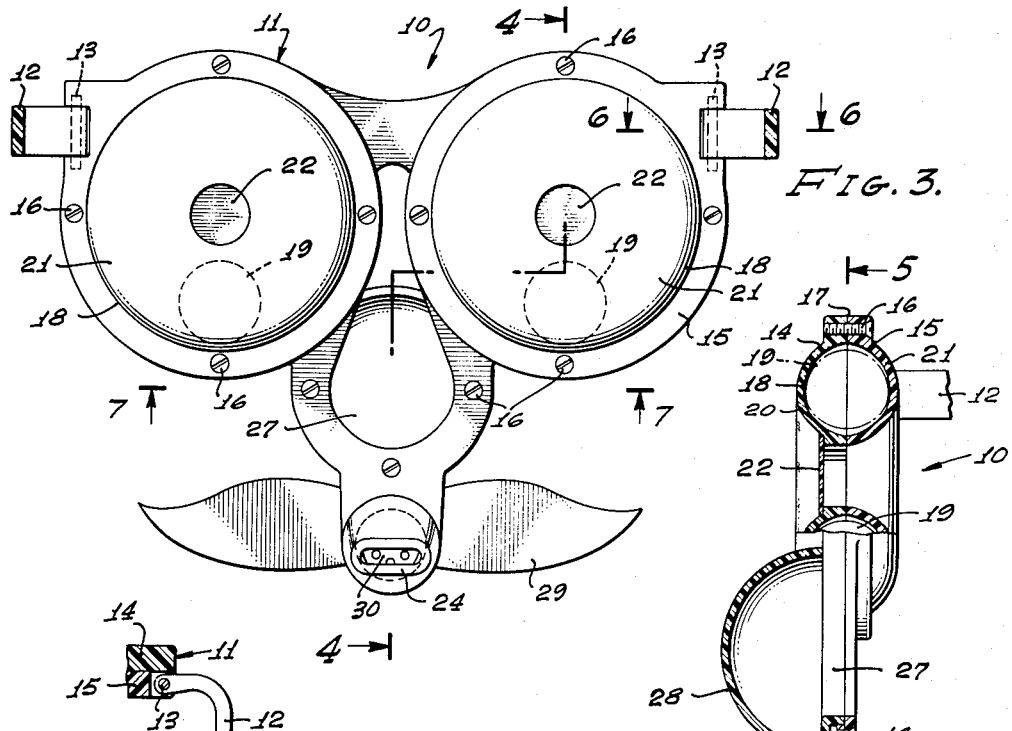
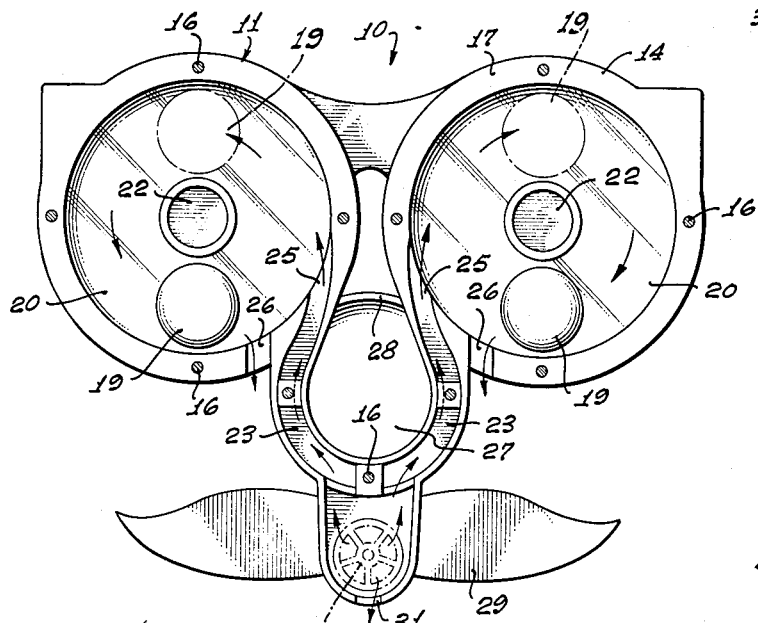
BERN WOLF,
INVENTOR.
BY Lyon & Lyon
ATTORNEYS.

United States Patent Office 2,748,528
Patented June 5, 1956

2,748,528

NOVELTY EYEGLASSES

Bern Wolf, Los Angeles, Calif., assignor to Eldon Manufacturing Co., Los Angeles, Calif., a corporation of California Application December 10, 1954, Serial No. 474,421

2 Claims. (Cl. 46—44)

This invention relates to toys and amusement devices and the like and is particularly concerned with novelty eyeglasses, false faces, masks, etc.

It is the principal object of this invention to provide a device of this type in which movable elements each representing the iris and pupil of the eye can be caused to move in a predetermined path for humorous effect.

A related object is to provide such a device in which said elements are caused to move when the wearer of the device blows air through a mouthpiece.

Another object is to provide such a novelty device in which the movable elements each simulating the iris and pupil of the eye travel in a circular path within a torus, the front portion of the torus being transparent so that the movable elements are clearly visible.

Other and more detailed objects and advantages will appear hereinafter.

In the drawings:

Figure 1 is a side elevation showing a preferred embodiment of my invention.

Figure 2 is a front elevation.

Figure 3 is a sectional elevation taken substantially on lines 3—3 as shown on Figure 1.

Figure 4 is a sectional view taken substantially on lines 4—4 as shown on Figure 3.

Figure 5 is a sectional view taken substantially on the lines 5—5 as shown on Figure 4.

Figure 6 is a sectional detail taken substantially on the lines 6—6 as shown on Figure 3.

Figure 7 is a sectional view from the under side taken substantially on the lines 7—7 as shown on Figure 3.

Referring to the drawings:

The novelty device generally designated 10, includes a frame 11 having ear pieces 12 connected thereto by means of hinge pins 13. The frame 11 includes a front section 14 and a rear section 15 connected by threaded fastenings 16 along a joint-plane 17. The sections 14 and 15 cooperate to form two laterally spaced torus rings 18. A ball 19 is mounted within each torus ring 18 and is free to travel in a circular path therein. The balls 19 are preferably dark in color while front face 20 of each torus ring 18 is preferably colorless and transparent. The back face 21 of each torus ring 18 is light colored but not transparent. The central opening in each torus ring may be closed by a blind disk 22 which is of light color but not transparent. The two balls 19 are plainly visible through the front faces 20 of the torus rings 18.

Means are provided for causing the balls 19 to travel around the circular tracks defined by the torus rings 18. As shown in the drawings, this means includes air passages 23 formed in the frame 11 and communicating with the mouthpiece 24. The mouthpiece 24 is formed on the rear section 15 and is adapted to be received between the lips of the wearer of the device, as best shown in Figure 1. When air is blown into the mouthpiece 24 it flows through passages 23 and emerges tangentially through inlet ports 25 into the interior of the torus rings 18. This causes each ball 19 to travel in a circular path around its torus cavity. Air escapes from the torus cavities through discharge ports 26 located near the inlet ports 25.

The wearer's nose projects into a central clearance 27 formed between the passages 23. A hemispherical shell 28 covers this cavity 27 and is shaped to give the appearance of a comic nose, see Figure 2. A false mustache 29 may be mounted on the frame 11 just below the position of the shell 28.

If desired, a noise-maker device such as a siren 30 may be mounted adjacent the mouthpiece 24 to produce an undulating wailing sound whenever air is blown into the mouthpiece 24. Air discharged from this siren 30 passes into the air passages 23. Excess air passes out through a by-pass port 31. An amusing effect is achieved in that the higher the pitch of the sound emitted by the siren, the faster the balls 19 travel in their circular tracks.

Having fully described my invention, it is to be understood that I do not wish to be limited to the details herein set forth but my invention is of the full scope of the appended claims.

I claim:

1. Novelty eyeglasses of the class described, comprising in combination: a frame adapted to be positioned in front of the eyes of a wearer, two movable ball elements each simulating the iris and pupil of an eye, stationary means on the frame defining transparently covered laterally spaced torus ring cavities each receiving one of the ball elements, pneumatic means on the frame for causing circular movement of said ball elements around their respective torus ring cavities, said pneumatic means including air passages on the frame each communicating with one of said torus ring cavities, and a mouthpiece communicating with said air passages, the mouthpiece being positioned to be received between the lips of the wearer.

2. Novelty eyeglasses of the class described, comprising in combination: a frame adapted to be positioned in front of the eyes of a wearer, two movable ball elements each simulating the iris and pupil of an eye, stationary means on the frame defining transparently covered laterally spaced torus ring cavities each receiving one of the ball elements, the frame having a central opening to provide clearance around the nose of the wearer, pneumatic means on the frame for causing circular movement of said ball elements around their respective torus ring cavities, said pneumatic means including air passages on the frame on opposite sides of said central opening each communicating with one of said torus ring cavities, and a mouthpiece communicating with said air passages, the mouthpiece being positioned to be received between the lips of the wearer.

References Cited in the file of this patent

UNITED STATES PATENTS

| 885,802 | Sterrick | Apr. 28, 1908 |
| 1,526,211 | Hirschman | Feb. 10, 1925 |
| 1,710,346 | Cohn | Apr. 23, 1929 |
| 2,526,619 | Gamache | Oct. 24, 1950 |